May 16, 1961

L. J. SEMON

CALL-HOLDER AND DIAL-THROUGH PLUG FOR CORD-OPERATED SWITCHBOARDS

Filed Feb. 24, 1958

2,984,702

INVENTOR
LAWRENCE J. SEMON 2,984,702
Patented May 16, 1961

2,984,702

CALL-HOLDER AND DIAL-THROUGH PLUG FOR CORD-OPERATED SWITCHBOARDS

Lawrence J. Semon, 918 Ocean Front, Santa Monica, Calif.

Filed Feb. 24, 1958, Ser. No. 716,965

2 Claims. (Cl. 179—1)

Figure 2:
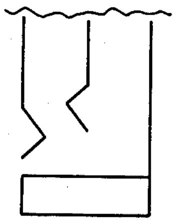

This invention relates to improvements in the operation of, and the increased efficiency of telephone answering systems employing cord-operated switchboards, and in an auxiliary and detachable plug and jack combination, and more specifically, to the use of this combination call-holder and dial-through plug in associated-use with the standard cord plugs tied directly into the switchboard circuits.

My invention, the call-holder and dial-through plug, is for use by owners and their operators engaged in the telephone answering service business and other businesses employing cord-operated switchboards. In telephone answering bureaus, their clients' lines are extended to secretarial jacks on cord-operated switchboards and during the clients' absence from their primary locations, their extension lines are answered by the telephone answering bureau operators. Many of these intercept cord-operated switchboards throughout the world are so constructed that once a call has been answered with a particular cord plug tied into the switchboard circuits, this particular cord plug may not be removed from that secretarial jack without breaking the connection established between the caller and the bureau operator. This does not permit substitution of cords so that in periods of peak loads of traffic, an operator on an adjacent board cannot substitute a cord plug from the adjacent board to assist the operator experiencing the peak load.

Some telephone companies to correct this failing, offer conference jacks, transfer jacks and installations of other descriptions. However, my invention provides a simple solution to the problem without any installation of any special equipment.

The object of this invention is to allow unlimited substitution of cord plugs as required on both incoming and outgoing calls without the hazard of losing the calls. Customarily, calls are in the control of the party originating the call and that line remains tied to the line called until the caller hangs up or until the connection is broken in the central office of the telephone company. On a cord-operated switchboard, in making an outgoing call, an operator inserts a cord plug into a trunkline jack, opens the key associated with the cord used and customarily receives a dial tone. After dialing and reaching the number dialed, she may not remove said plug from said line or switchboard trunkline jack, unless she wishes to terminate the call. In short, an outgoing call on a trunkline jack is lost when the plug is removed.

With my invention superimposed on the standard plug of a switchboard cord, she may repeat the procedure outlined above and after reaching the called party, she may disengage the board plug from the jack of my invention leaving the call-holder dial-through plug in the trunkline jack thereby holding the outgoing call while substituting the cord plug of an adjacent board so that another operator may complete the call.

My invention comprises one variable circuit with novel methods and combinations and arrangements of elements which will more fully appear in the following specification and will be pointed out with particularity in the appended claims.

Figure 1:
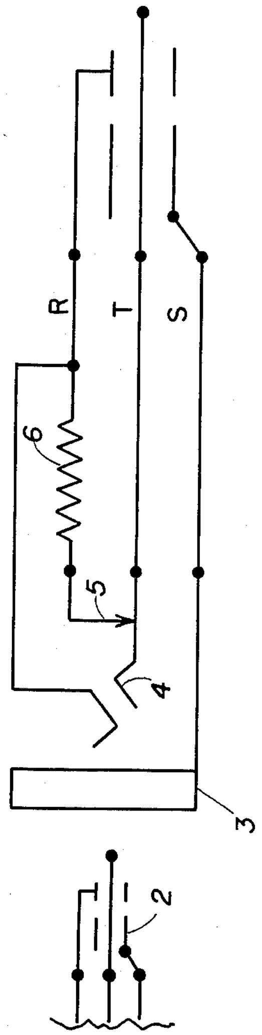

The wiring diagram which is Fig. 1, shows one example of how my invention may be carried out. Fig. 2, is a fragmentary diagrammatic view of a cord-operated switchboard jack, standard equipment on all cord-operated boards.

In the wiring diagram, 2 is a fragmentary view of a standard switchboard cord plug which when inserted into jack 3, of the combination call-holder dial-through unit, depresses tip 4, breaking contact 5, thereby removing resistor 6, from the circuit. By inserting plug 2 in the unit of Fig. 1, and plugging this unit into the jack of Fig. 2, an incoming call may be answered. When necessary to substitute a cord plug other than 2, the operator merely holds her thumb nail against the rim of jack 3, and disengages plug 2, thereby releasing tip 4, to make contact at 5, and activating resistor 6, and thereby providing the resistance necessary to hold the incoming call in the switchboard jack of Fig. 2. The operator may then take a cord plug from an adjacent board and insert said plug from the adjacent board into jack 3, depressing tip 4, breaking contact at 5, and separating resistor 6, from the circuit. The operator on the board associated with the substituted plug may then open the key associated with said plug and take over the call. The same process would be followed on an outgoing call dialed through my invention in a trunkline jack.

From the foregoing it is apparent I have invented a simplified means of providing assistance to operators on cord-operated switchboards during peak traffic load periods and to increase the speed and efficiency with which calls are answered, and consequently, contributing greatly to the public interest in the communication of intelligence.

While I have illustrated one example of carrying out my invention, I hereby reserve the right to make numerous changes within the scope of the appended claims.

I claim:

1. A plug adapter for cord operated telephone switchboards, comprising: a plug member having standard plug terminals at one end and a standard jack socket at its other end; a resistance element within said member normally connected across said plug terminals; and contact means within said member connected between one end of said resistance element and one of said plug terminals, said contact means being positioned for engagement by a standard plug when inserted within said jack socket for disconnecting said resistance element and biased towards its normally closed position so that removal of said standard plug reconnects said resistance element.

2. A plug adapter for cord operated telephone switchboards comprising: a plug member having co-axial inner and outer plug terminals at one end for reception within a switchboard jack; a standard jack socket at the other end of said plug member for reception of a standard cord plug, said socket including inner and outer jack terminals; conductors within said plug member connecting said inner and outer jack terminals to said inner and outer plug terminals respectively; a resistance element connected at one end to one of said conductors within said member and having its other end terminating in a contact normally in engagement with the one of said jack terminals connected to the other of said conductors, said one of said jack terminals being resiliently biased against said contact and physically positioned within said plug member to be engaged and physically separated from said contact by said standard cord plug upon insertion of said standard cord plug within said jack socket, whereby call holding current passing through said resistance from said switchboard is transferred to said standard cord plug upon insertion thereof and transferred back through said resistance upon removal thereof so that a path is always provided for said call holding current when substituting another cord plug.

References Cited in the file of this patent

UNITED STATES PATENTS

| | | |
|---|---|---|
| 1,293,060 | Edwards | Feb. 4, 1919 |
| 1,568,297 | Smalenberger | Jan. 5, 1926 |
| 2,128,411 | Halligan | Aug. 30, 1938 |
| 2,375,678 | Newstedt | May 8, 1945 |
| 2,754,366 | Matteo | July 10, 1956 |
| 2,826,644 | Pease | Mar. 11, 1958 |